United States Patent [19]

Mears

[11] 3,900,848
[45] Aug. 19, 1975

[54] SYNCHRONOUS PULSE DIGITAL FILTER
[75] Inventor: William E. Mears, Leawood, Kans.
[73] Assignee: Sperry Rand Corporation, New York, N.Y.
[22] Filed: July 20, 1973
[21] Appl. No.: 381,344

[52] U.S. Cl. .............................. 343/7.3; 343/5 DP
[51] Int. Cl.² ........................ G01S 9/16; G01S 9/56
[58] Field of Search ......................... 343/7.3, 5 DP

[56] References Cited
UNITED STATES PATENTS

| | | | |
|---|---|---|---|
| 3,353,177 | 11/1967 | Wilmot et al. ........... | 343/5 DP |
| 3,503,068 | 3/1970 | Yamauchi ................. | 343/7.3 |
| 3,727,215 | 4/1973 | Wilmot ..................... | 343/5 DP |
| 3,781,888 | 12/1973 | Bail .......................... | 343/7.3 X |

*Primary Examiner*—T. H. Tubbesing
*Attorney, Agent, or Firm*—Howard P. Terry; D. A. N. Chase

[57] ABSTRACT

In distance measuring equipment utilized in radio navigation, a detector is provided in the airborne receiver which locates the synchronous reply pulse from the ground transponder transmitted in response to an interrogation pulse from the airborne transmitter. This is accomplished digitally by a shift register that serves as a continuously operating memory during each range scan. The memory bits of the register represent a corresponding number of range intervals covering the range being scanned in each interrogation. Received pulses (which will include random pulses as well as the synchronous reply pulse if it is present) excite the input memory bit and are transferred along the register in synchronism with the range intervals of the scan; thus, at the end of the scan, pulse information will be stored in the register at those bits corresponding to range intervals at which pulses were received. This information is recirculated during the next range scan, and addition-subtraction logic at the input causes the non-synchronous pulses to be destroyed from memory and multiple pulse information to be accumulated in adjacent bits at the range at which a newly arriving pulse is received in synchronism with the recirculating information. Accordingly, by successive scans, a pulse train is accumulated at the range of the recurring synchronous reply pulse, range acquisition being confirmed when the fifth pulse of the train appears at the signal input. Having located the synchronous pulse, operation in the search mode ceases and the equipment commences range tracking and produces a continuous range indication that may be displayed to the pilot.

19 Claims, 8 Drawing Figures

PATENTED AUG 1 9 1975 3,900,848

SYNCHRONOUS PULSE DIGITAL FILTER

This invention relates to improvements in distance measuring equipment (DME) and, more particularly, to a receiving system for locating a synchronous return pulse occurring among random pulses wherein a continuously operating memory is employed to locate and then verify the identity of the synchronous return pulse in a minimum number of range scans.

In DME and TACAN systems, an interrogation pulse is transmitted by the aircraft and the ground station (transponder) responds with a reply pulse. The interrogated station continues to reply in response to each interrogation, and the airborne receiver must then locate and identify this pulse from among random or squitter pulses that are also emitted by the transponder. Since time is equated to distance, the reply pulse of interest is in the nature of a synchronous pulse occurring among the nonsynchronous, random pulses that are transmitted for such purposes as identification of the ground station and to provide a reference for the automatic gain control circuitry of the receiver.

The interrogation pulse is repeated many times per second, and each of such pulses initiates a range scan in which the receiver listens for a synchronous reply. This is the search mode during which time the airborne equipment attempts to identify a synchronous pulse received along with the various random pulses that are also being transmitted by the ground station. Range acquisition occurs when the identity of the synchronous pulse is verified, and the airborne equipment then commences range tracking and provides a continuous range indication as an output.

In early DME ranging systems, mechanical servo systems were utilized which moved a gate through the range of interest at a slow rate in the search mode while listening for a synchronous reply pulse. The time required for range acquisition, therefore, depended upon the repetition frequency of the interrogation pulses (PRF), the width of the range gate, and the number of replies required to lock the gate in the track mode. These three factors determined the speed at which the gate scanned the range and thus determined the time required in the search mode to achieve range acquisition. Search times up to 30 seconds at PRF rates of 150 Hz were common.

An improvement over the mechanical system is represented by U.S. Pat. No. 3,267,464 to Oscar Shames, wherein a system is disclosed that electrically sweeps the range of interest. In the Shames system the first reply pulse is checked and then the system proceeds to later received pulses step by step in subsequent scans or sweeps. Thus, the reply pulses are tested for synchronism in a step-by-step fashion with the occurrence of each interrogation pulse. Although this electrical technique is considerably faster, many scans are normally required before range acquisition is achieved; thus, a relatively high PRF of approximately 150 Hz is necessary.

The PRF is of importance when it is considered that the range determination must be made quickly in any practical application. Since in any system a number of interrogations are required before the synchronous reply pulse is positively identified, one solution is to maintain the PRF relatively high (on the order of 150 Hz) so that the equipment may quickly make the range determination and then commence range tracking. However, the disadvantage in a high PRF is that the total system will be at capacity handling a fewer number of aircraft the higher the PRF. Accordingly, the desirability of fast range determination must be balanced against the further desire to prevent overloading of the ground station transponder so that it may respond to a maximum number of interrogators without reaching capacity.

It is, therefore, an important object of the present invention to provide a receiving system for DME which does not require a high PRF to quickly identify the synchronous reply pulse irrespective of the location of the synchronous pulse in the range scan.

As a corollary to the foregoing object, it is an important aim of this invention to provide detection circuitry for use in DME and in other applications where a synchronous pulse is returned to a receiver during each of a number of repeated range scans, wherein the circuitry correlates the pulse information received during successive scans to locate the recurring, synchronous pulse in order to make a range determination.

Another important object of the invention is to provide a method and apparatus for locating a synchronous return pulse, in which a continuously operating memory is utilized that remembers all (or most all) of the received pulses in each range scan and wherein such pulse information is correlated with the pulses received during subsequent scans to almost immediately identify and separate the synchronous pulse from random pulses.

Still another important object of the invention is to provide a method and apparatus as aforesaid wherein the amount of time required to identify the synchronous pulse depends entirely upon the mathematical statistics of the situation and not upon the complexity of the circuitry.

Yet another important object of the invention is to provide a method and apparatus as aforesaid wherein the correlation is achieved by recirculation logic which compares previously stored pulse information with newly arriving pulses to update the memory as each range scan is effected.

Furthermore, it is an important object of this invention to provide a method and apparatus as aforesaid wherein the pulse information is stored in memory in digital form, and wherein a pulse train is accumulated in the memory at the range at which the synchronous pulse is occurring to thereby verify the identity of such synchronous pulse.

Additionally, further objects of the invention include the capability of locating and identifying more than one synchronous pulse at different ranges, the provision of a system of this type which also facilitates the tracking of the synchronous pulse once it has been identified, the capability of detecting additional synchronous pulses while the system is in the track mode, and the provision of a system whose features are useful in radar search and tracking as well as in the transponder type of detection and in any application, such as collision avoidance systems, requiring extremely fast response.

SUMMARY OF THE INVENTION

In DME and TACAN systems in present use, the ground transponder replies to airborne interrogations with a pulse pair. It adds nonsynchronous or random pulse pairs (called squitter) to the replies in order to maintain an average pulse pair rate of from 700 to 2700

Hz. Minimum pulse pair to pulse pair spacing of 50 microseconds is maintained. Also, a built-in constant system delay of 50 μsec is inserted (delay between arrival of an interrogation and transmission of the reply pulse pair). Reply efficiency of at least 70 percent is guaranteed in normal operation.

The airborne receiver utilizes a decoder that processes each incoming pulse pair and supplies the ranging circuit with a single pulse. Thus, in the description to follow, pulse pairs will not be considered. These pulses from the decoder will also have a minimum spacing of 50 μsec.

In the detection circuitry of the present invention, a shift register is employed having memory bits that divide the range being scanned into range intervals corresponding to pulse spacings of 50 μsec or less. In the preferred embodiment of the invention to be described hereinafter, the shift register is clocked with a square wave having a period of 20 μsec (thus each bit is equivalent to 1.6 miles) and sufficient bits are provided to cover the range being scanned. It is to be remembered that, since the aircraft is sending interrogation pulses and receiving reply pulses, the distance that the aircraft is from the ground station is a function of the time required to interrogate and receive the reply pulse.

Received pulses are directed to the input memory bit of the register. Disregarding the correlation aspect of the invention for the moment, it will be assumed that a pulse is received during a given range interval and excites the input memory bit of the register, causing it to go from the 0 to the 1 logic level. This information (as well as other incoming pulse information during a scan) is shifted down the register from bit to bit at the clocking rate until the end of the scan. At that time, the logic levels of the various memory bits (corresponding to range intervals) are storing the pulse information derived from that scan.

During the next range scan the information already in the register is correlated with newly arriving pulses through the use of recirculation logic that causes random pulses to be destroyed from memory and synchronous pulses to be accumulated therein to verify the identity of the synchronous reply pulse and the range interval at which it is occurring. For example, in a simplified illustration, if a random pulse was received during the first range scan at the fifth range interval, then this pulse will most likely not recur during the fifth range interval of the second scan and the logic prevents the previously stored pulse from being restored in the register on the second scan. However, if the pulse at the fifth interval is the synchronous pulse, and assuming that the transponder responds without a "miss," a pulse again appears at the fifth range interval during the second scan and the recirculation logic then causes two pulses to be stored in the memory. To prevent interference from noise pulses and to reserve several range intervals for correlation purposes, the generation of pregates and postgates makes it possible for the memory to accumulate a pulse train in a series of adjacent bits, pulses being either added to or subtracted from the train on successive scans depending on whether or not the synchronous pulse reappears. Once a train of four pulses has been stored in response to a synchronous pulse, the system completes the search mode and indicates range acquisition when the next synchronous pulse is received to make a five-pulse train.

GENERAL DESCRIPTION OF THE DETECTOR

Figure 1:
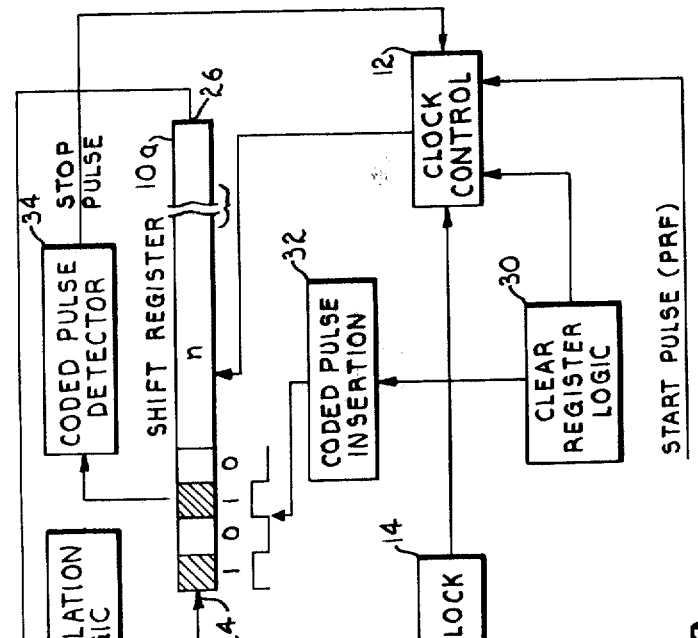
FIG. 1 is a block diagram of the detection circuitry of the present invention, showing the preferred manner of controlling the clocking of the shift register through the use of a coded pulse.
Figure 2:
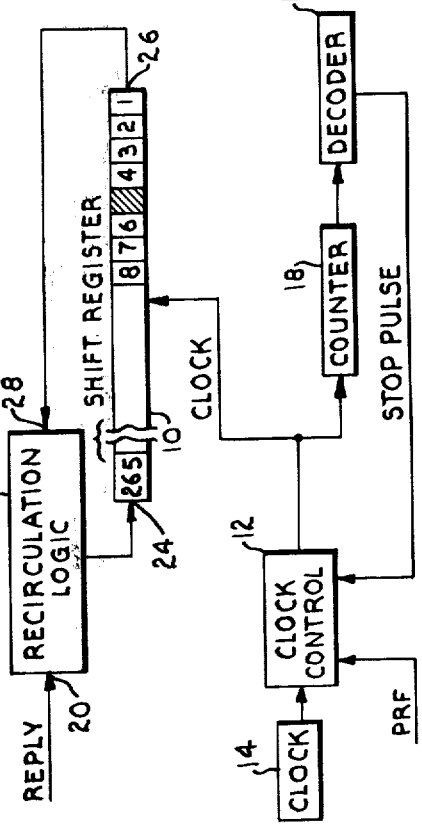
FIG. 2 is a block diagram similar to FIG. 1, but illustrating an alternative means of controlling the clocking of the register.

FIG. 2 will first be described in order to provide background for a full understanding of the operation of the detection circuitry shown in FIG. 1 which employs the preferred manner of controlling the clocking. A shift register 10 has n stages or memory bits, n being a number determined by the range being scanned and the clocking rate. Each memory bit corresponds to a range interval of 1.6 miles utilizing a square wave clock pulse having a period of 20 μsec as discussed above. Accordingly, with n equal to 265, for example, a range of approximately 420 miles is covered in a scan. In FIG. 2 the first eight stages of the register 10 and the final stage (number 265) are diagrammatically illustrated, the fifth stage being shaded to represent the 1 logic level in this memory bit; stages 1–4, 6–8 and 265 are not shaded to represent the 0 logic level in these bits. The condition of the register 10, therefore, corresponds to the previous illustration where a pulse was received at the fifth range interval, causing the fifth memory bit to assume the 1 logic level.

The interrogation transmitter (not shown) delivers an interrogation or search pulse from the transmitting antenna. As is the case with the random pulses and reply pulses generated by the ground transponder, each interrogation pulse is in the form of a pulse pair but it may be considered as a single pulse insofar as the following description is concerned. The interrogation pulse is repeated at a repetition frequency (PRF) that is governed in part by the response speed of the airborne receiver in the search mode. In the present invention, a PRF on the order of 10 Hz may be utilized and rapid range acquisition will be achieved. In the description to follow, reference will be made to a "PRF pulse" which is internally generated by the interrogation transmitter circuitry and which initiates the delivery from the antenna of the interrogation pulse pair. The PRF pulse is employed in the receiver circuitry as a start pulse to initiate the scan in the search mode at the time each interrogation pulse is transmitted.

Again referring to FIG. 2, the PRF pulse is applied to a clock control 12 which is a gate that either blocks or passes the output from the clock 14. The PRF pulse is effective to open the clock control gate 12, whereas a stop pulse delivered by a decoder 16 is effective to close the gate 12 and interrupt the delivery of clock pulses to the register 10. A counter 18 monitors the clock pulses delivered to the register 10, and when 265 have been delivered (assuming 265 memory bits in the register 10) the decoder 16 senses this condition and produces the stop pulse.

Any reply pulses (and random pulses) received during an individual range scan appear at an input 20 of input and correlating circuitry 22 having recirculation logic of prime importance in the operation of the detector of the present invention. The output from the logic circuitry 22 is delivered to the serial input 24 of the register 10 causing excitation of the input memory bit. The serial output 26 of the register 10 is connected to a second input 28 of the logic circuitry 22.

Referring to the previous illustration and assuming that the first, initial range scan is beginning, the PRF pulse opens the clock control gate 12 and the receiver is conditioned to "listen" for reply pulses. The detection circuitry begins scanning by the action of the clock pulses now being applied to the shift register 10. Five range intervals after commencement of the scan, a pulse is received and is delivered to the memory bit at the serial input 24. Therefore, at the end of the scan, the condition of the register 10 is as illustrated since the 1 logic level is transferred from bit to bit down the register by the clock pulses. The decoder 16 senses the end of the scan and closes the clock control gate 12, leaving the pulse information in storage in the register 10.

The above-described action repeats on the second scan in response to the next PRF pulse at the clock control gate 12. However, there is now pulse information in the register 10 which is recirculated via the serial output 26 and the input 28 of the logic circuitry 22. Accordingly, information is fed from the output 26 of the register 10 as new information in the form of newly arriving pulses is fed into the input 24. Assuming that a pulse does not reappear during the fifth range interval on the second scan, the recirculation logic subtracts one pulse from the recirculating pulse information so that, at the end of the second scan, the fifth memory bit has returned to the 0 logic level. However, if it is assumed that the pulse at the fifth interval is the synchronous reply pulse and that such pulse reappears at the input 20, then the recirculation logic effects an addition function to now cause a train of two pulses to be stored in the register 10 at the fifth and sixth memory bits. In this manner, a pulse train is accumulated which, once a predetermined pulse count is reached, verifies the identity of the synchronous return pulse and causes the detection circuitry to indicate range acquisition and go into the track mode. As will be discussed fully hereinafter, the use of pregates and postgates prevents interfering pulse trains and reserves bits for correlation purposes adjacent the bit corresponding to the range interval at which the reply pulse is recurring.

Referring to FIG. 1, the detection circuitry there illustrated operates in the same manner as in FIG. 2 insofar as the correlation of received pulses is concerned. The shift register 10a has four additional stages at the end of the register for the purpose of receiving a coded index pulse utilized in the control of the clocking of the register. At the outset prior to the first scan, the clear register logic 30 executes two functions, insertion of the index pulse and opening of the clock control gate 12 to clear the register 10a. Insertion of the index pulse is illustrated by the functional block 32 in the diagram representing circuitry that causes the code 1010 to appear in the last four stages of the register adjacent the serial input 24. The insertion circuitry 32 also inhibits these four stages of the register 10a from shifting in response to the clock pulses so that the index code remains in the register while the information memory bits n are cleared of any previous pulse information that may be in storage.

The PRF pulse starts the scan in the same manner as described above by opening the clock control gate 12 to apply the clock pulses to the register 10a as the receiver listens for a reply at the input 20. The end of the scan is sensed by the coded pulse detector 34 which is responsive to the reappearance of the 1010 index code in the last four bits of the register. At this time a stop pulse is generated by the coded pulse detector 34 to close the gate 12 and terminate the delivery of clock pulses to the register 10a. The logic levels in the n memory bits of the register now represent the pulse information received during the various range intervals of the scan. With $n$ equal to 265, a total of 269 stages is required in the register 10a to accommodate both the range interval bits and the storage bits for the index code.

DETAILED DESCRIPTION

Before proceeding with FIG. 4, certain of the logic elements appearing therein are explained with reference to FIG. 3. A NAND gate is illustrated at 36 having inputs A and B, the logic level at the output being shown in the accompanying truth table. For example, with both the A and B inputs at the 1 logic level, the output of the NAND gate 36 is at the 0 logic level. Similarly, a NOR gate is illustrated at 38 and a negative logic NAND gate at 40 with accompanying truth tables.

Figure 3:
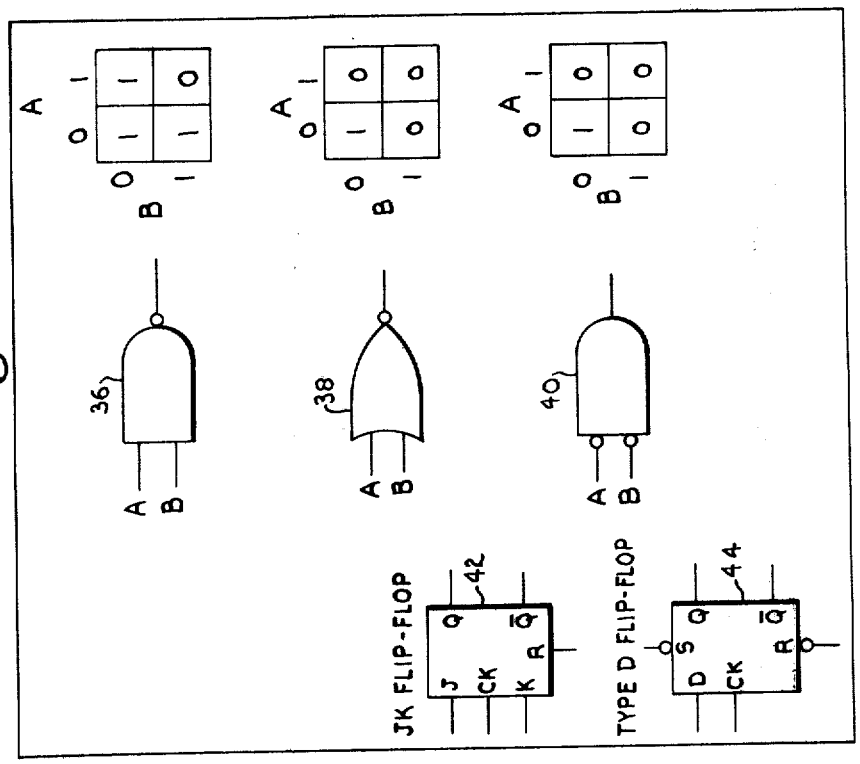
FIG. 3 illustrates some of the logic elements used in the circuitry of the present invention.

Also referring to FIG. 3, a JK flip-flop is shown at 42 and a type D flip-flop at 44. The JK flip-flop 42 has a J input, a clock (CK) input, a K input, a Q output, and a NOT Q ($\overline{Q}$) output. All clocking is accomplished on the positive going edge of the square wave clock pulse. When the J input is at the high or 1 logic level, the flip-flop 42 will set on the next clock pulse appearing at the CK input (Q high and NOT Q low). With the K input at the high logic level, the flip-flop 42 will reset on the next clock pulse at the CK input (NOT Q high and Q low). If the J and K inputs are both maintained high, the flip-flop outputs toggle on successive clock pulses. If the J and K inputs are both maintained at the low or 0 logic level, the flip-flop 42 will not respond to clock pulses. The flip-flop 42 is also provided with an additional, reset input R which, when maintained at the high level, overrides the J, CK and K inputs.

The type D flip-flop 44 has a D input, a clock (CK) input, a Q output, and a NOT Q output. When the D input is high, the flip-flop 44 sets on the positive going edge of the next clock pulse appearing at the CK input. With the D input low, the flip-flop 44 resets on the next clock pulse. Additionally, an inverted set input S and an inverted reset input R are provided, either of which overrides the D and CK inputs when the low logic level is applied. Therefore, during normal operation in response to the D and CK inputs, both the S and R inputs are maintained at the high logic level.

Figure 4:
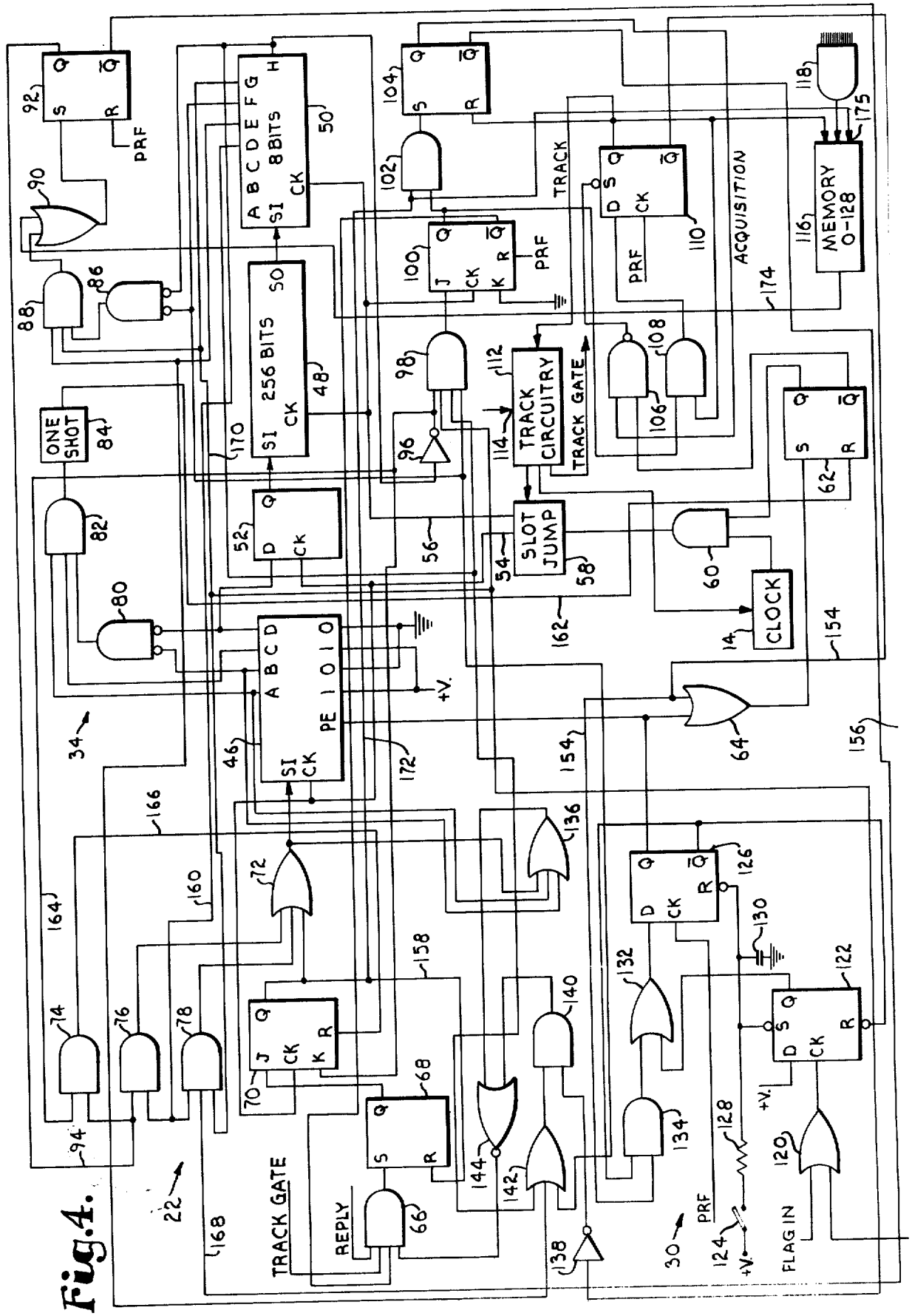
FIG. 4 is a detailed block and logic diagram of the detection circuitry, and shows the interconnection of such circuitry with apparatus utilized in the track mode after range acquisition.

In FIG. 4 leads labeled +V carry voltage at the high or 1 logic level. The ground symbol represents circuit ground and also corresponds to the low or 0 logic level. All leads represent logic flow, as power connections are not illustrated.

Now referring to the detailed logic of the detection circuitry portrayed in FIG. 4, the shift register 10a in practice comprises three registers 46, 48 and 50 in series relationship, and an intervening flip-flop 52 between the registers 46 and 48. The first register 46 is a four bit shift register having a serial input SI, a clock input CK and four outputs corresponding to the four bits identified A, B, C and D respectively. A parallel enable input PE permits the index code 1010 to be loaded in parallel into the four bits of the memory, as represented by the four inputs identified 1, 0, 1, and 0 respectively.

The D output of the fourth bit of the register 46 is connected to the D input of the flip-flop 52, the Q output thereof being connected to the serial input SI of the second shift register 48. This register contains 256 memory bits and is provided with a clock input CK and a serial output SO. The output of the register 48 is received at the serial input SI of the third shift register 50, the latter having an eight bit capacity and being provided with eight parallel outputs labeled A, B, C, D, E, F, G and H respectively. The clock input CK of the register 50 is tried to the CK input of the register 48, and the CK inputs of the register 46 and the flip-flop 52 are likewise interconnected. Separate leads 54 and 56 from a slot jump network 58 feed clock pulses to the register 46 and flip-flop 52, and the registers 48 and 50 respectively. Other circuit elements involved in the clocking include an AND gate 60, a set-reset flip-flop 62, and an OR gate 64. The output of the clock 14 is connected to one of the two inputs of the AND gate 60.

The input and correlating circuitry 22 includes an input AND gate 66, a set-reset flip-flop 68, a JK flip-flop 70, and an OR gate 72 having its output connected to the SI input of the register 46. Three AND gates 74, 76 and 78 form a part of the recirculation logic, the outputs of the gates 76 and 78 being connected to two of the three inputs of the OR gate 72. The third input is connected to the Q output of the flip-flop 70. The output of the AND gate 74 is connected to the overriding reset input R of the flip-flop 70.

The index code detector 34 employs a negative logic NAND gate 80, an AND gate 82, and a monostable multivibrator (one shot) 84 whose output is fed to the reset input R of the flip-flop 62. The two inputs of the NAND gate 80 are connected to the B and D outputs respectively of the register 46, and two inputs of the AND gate 82 are connected to the A and C outputs respectively. The output of the NAND gate 80 feeds directly into the third input of the AND gate 82. The trigger input of the one shot 84 is connected to the output of the AND gate 82.

An inhibit function (to be discussed) in response to the presence of the index code in the third register 50 is executed by a negative logic NAND gate 86, an AND gate 88, an OR gate 90, and a set-reset flip-flop 92. An inhibit lead 94 extends from the Q output of the flip-flop 92 to one of the inputs of the AND gate 76 in the input and correlation circuitry.

The acquisition logic responsive to the accumulation of a five pulse train in the registers comprises an inverter 96, an AND gate 98, a JK flip-flop 100, an AND gate 102, a set-reset flip-flop 104, a NAND gate 106, an AND gate 108, and a type D flip-flop 110. The inverter 96 is connected to the H output of the register 50 and thus provides a NOT H input to the gate 98. The other three inputs of the AND gate 98 are connected to the D, G and F outputs respectively of the register 50.

The track circuitry is represented by the functional block 112 which has two inputs and three outputs. One input receives the track command directly from the Q output of the flip-flop 110. The second input 114 is at the high logic level whenever the outputs of AND gates 66 and 98 are high contemporaneously with the high logic level at the NOT Q output of flip-flop 110. One output of the track circuitry 112 is connected to the slot jump network 58, the second output executes a clock delay or phasing function and is connected to the clock 14, and the track gate appears on the third output and is applied to one of the inputs of the AND gate 66.

A memory 116 is also employed in the track mode and comprises a counter capable of counting up to 128. The logic utilizes three inputs, one receiving the track command, a second connected to the output of an AND gate 118, and a third input connected to the Q output of flip-flop 70. The AND gate 118 is a twelve input gate (connections thereto are not shown for clarity), such inputs being connected to the A-D outputs of register 46 and the A-H outputs of register 50. The output of the memory 116 is connected to one of the inputs of the OR gate 90.

Now referring to the clear register logic 30, an OR gate 120 has its output connected to the CK input of a type D flip-flop 122. The OR gate 120 responds to either a "flag" signal (such as an indication that the pilot has changed frequencies to a different DME station) or the NOT Q output of flip-flop 110 which would be a command to change from track back to the search mode. A power on-off switch 124 applies the high level logic voltage to the set input of the flip-flop 122 and the reset input of a type D flip-flop 126. A delay is inserted by a series resistor 128 and a capacitor 130 connected from the mentioned set and reset inputs to ground. The D input of the flip-flop 126 receives the output of an OR gate 132, one input thereof being connected to the output of an AND gate 134. The Q output of the flip-flop 126 is connected directly to the parallel enable input PE of the register 46 and to one of the inputs of the OR gate 64.

The generation of pregates and postgates is subject to the logic of an AND gate 136, an inverter 138, an AND gate 140, an OR gate 142, and a NOR gate 144. The output of the NOR gate 144 executes an inhibit function and is connected to one of the inputs of the input AND gate 66. Generation of the pregate is controlled by inverter 138 and gates 140 and 142, the input of the inverter 138 being connected to the G output of the register 50 while the three inputs of the OR gate 142 are connected to the D, E and F outputs thereof. The OR gate 136 controls the postgate generation, its three inputs being connected to the output of OR gate 72 and the A and B outputs of the register 46.

Figure 5:
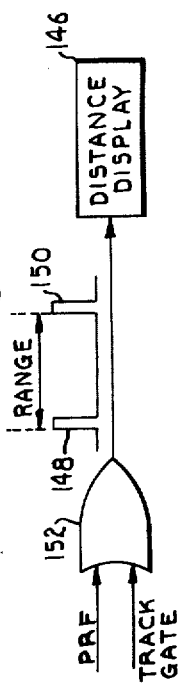
FIG. 5 is a diagram illustrating the output of the receiver system.

The output of the receiver system is illustrated in FIG. 5 and is in the form of a distance display 146. The distance (range) is determined by measuring the time interval between the leading edge of the PRF pulse 148 and the leading edge of the track gate 150, the pulses 148 and 150 being illustrated in FIG. 5 delivered from the output of an OR gate 152. The time interval measurement (and hence the range) is commonly made by a counter (not shown) in the distance display apparatus that counts the pulses produced by a high frequency oscillator, the high frequency timing pulses being applied to the counter input by a gate that opens in response to the PRF pulse 148 and closes in response to the track gate 150. The counter logic, of course, includes compensation for the 50 μsec delay of the ground station transponder. A seven segment numeric readout may be employed to provide a digital display that is continuously updated as the synchronous reply pulse is tracked.

OPERATION IN SEARCH MODE

Referring to FIG. 4, the clear logic 30 responds to any one of four signals or conditions to effect clearing of the registers 48 and 50 and the flip-flop 52. First, the registers are automatically cleared when the power is turned on by closure of switch 124; this will be discussed fully hereinafter. Second, loss of the index code in the recirculating loop (a malfunction condition caused by an intermittent connection, for example) causes automatic clearing and is recognized by the receipt of two sequential PRF pulses at the CK input of flip-flop 126 without an intervening output at the high level from the Q output of flip-flop 92. Note that the NOT Q output of flip-flop 92 is connected via a lead 154 to one of the two inputs of the AND gate 134; the high logic level will remain on lead 154 if the index code is lost and not recognized by the flip-flop 92. Third, a flag signal from the receiver at the OR gate 120 initiates clearing. Fourth, changing from track mode to search mode also initiates clearing via the OR gate 120, as one of its inputs is connected by a lead 156 to the NOT Q output of flip-flop 110.

The clear logic 30 responds to any of these four conditions by setting flip-flop 126 to raise the Q output thereof to the high level, thereby raising the parallel enable input PE of the register 46 to the high level. This loads in the 1010 index code and holds the register 46 while the flip-flop 52 and the registers 48 and 50 are cleared. Assuming the condition wherein switch 124 is closed, the low logic level is initially applied to the set input of flip-flop 122 and the reset input of flip-flop 126, due to the delay in voltage buildup across the capacitor 130. Accordingly, flipflop 122 will be set and flip-flop 126 will be reset.

Once capacitor 130 charges to the high logic level, the overriding reset is released and flip-flop 126 is then responsive to signals appearing at its D and CK inputs. The D input will be high since flip-flop 122 is set. Therefore, flip-flop 126 sets on the next PRF pulse appearing at its CK input. With the Q output of flip-flop 126 now at the high logic level, the parallel enable is activated and flip-flop 62 is set via the OR gate 64. This enables the AND gate 60 to permit clock pulses from the clock 14 to pass to the slot jump network 58 and thence along leads 54 and 56 to the flipflop 52 and the registers 48 and 50. Accordingly, the index code is loaded into the register 46 and the same is held, while any information previously in storage in flip-flop 52 and the registers 48 and 50 is cleared by the application of clock pulses and the absence of any input to the D input of flip-flop 52. This condition remains unchanged until the next PRF pulse. At that time, flip-flop 126 is reset since its D input is now low due to the previous resetting of flipflop 122 at the time that the flip-flop 126 was set. The resetting of the flip-flop 126 releases the first register 46 to condition the detection circuitry for the handling of received pulses arriving at the REPLY input of AND gate 66.

Having cleared the registers and loaded in the index code, it will now be assumed that an initial range scan has just been initiated by a PRF pulse. Noting flip-flop 92, it may be seen that each PRF pulse resets this flip-flop to remove the inhibit function from the lead 94. The circuitry is now conditioned to listen for received pulses as the scan progresses. Clock pulses are being applied to the registers, and the index code is shifting out of the first register 46 on down the line through the 265 information bits (the storage capacity of flip-flop 52 and registers 48 and 50).

In the previous illustration in connection with FIGS. 1 and 2, a reply pulse was received at the fifth range interval. Continuing this illustration, a reply pulse from the decoder of the receiver occurring during the fifth range interval sets the flip-flop 68 to, in turn, set flip-flop 70 on the next clock pulse. It should be understood that, at this time, the TRACK GATE input of AND gate 66 is maintained continuously at the high level. Also, the output from NOR gate 144 is high and flip-flop 100 is reset so that its NOT Q output is high, the PRF pulse having been applied to its reset input. Accordingly, the input AND gate 66 is conditioned to pass any received pulses on to the S input of the flip-flop 68.

With the flip-flop 70 set, the high logic level at its Q output is fed directly to the serial input SI of register 46 by the OR gate 72. This places the first bit of the register 46 at the high level on the following clock pulse, and this information is transferred from bit to bit down the line on succeeding clock pulses. The flip-flop 70 is subsequently reset since its Q output is connected by a lead 158 to the reset input of flip-flop 68. With flip-flop 68 reset, the J input of flip-flop 70 is now low and no longer controls. The K input will be high due to the NOT H output from register 50. Accordingly, flip-flop 70 resets on the next clock pulse.

Figure 6:
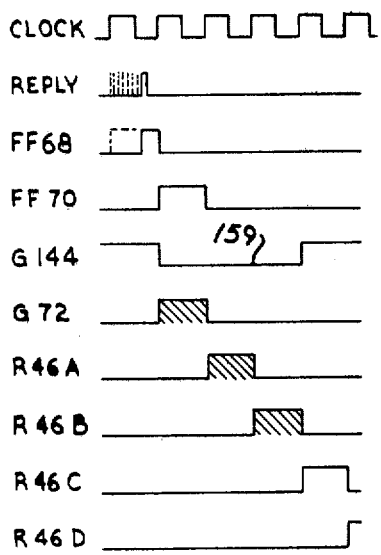
FIGS. 6, 7 and 8 are timing diagrams illustrating the operation of the circuitry in the search mode.

The action just described is depicted in the timing diagram of FIG. 6. The logic levels of the outputs of the identified elements are shown in FIG. 6 in time relation to the square wave clock pulses (identified "CLOCK"). The flipflop gates and registers are identified by their reference numerals, as "FF 68" by the third line representing the Q output of flip-flop 68. The phantom lines illustrate that the received pulse at the REPLY input may occur any time during the range interval corresponding to that clock pulse.

FIG. 6 also illustrates the generation of a three-bit (three slot) postgate 159 which inhibits the input AND gate 66 for three range intervals following the fifth range interval at which the pulse was received. This action occurs by virtue of OR gate 136 whose output is directed to the NOR gate 144. The three inputs of the OR gate 136 are connected to the output of gate 72 and the A and B outputs of register 46 respectively; therefore, as illustrated by the shaded pulses in FIG. 6, the postgate 159 is maintained as the pulse is clocked through the B output of register 46.

At the end of the scan, the index code 1010 appears at the E, F, G and H outputs of the register 50 and initiates a special function at that time. Since F and H are at the low logic level (the two 0's of the index code), the output of the negative logic NAND gate 86 is at the high level. The high level, E and G outputs of register 50 are connected directly to two inputs of the AND gate 88. Since the third input of gate 88 receives the high level output from gate 86, the gate 88 delivers an output through OR gate 90 to the S input of flip-flop 92, setting the same and raising inhibit lead 94 to the high logic level. This inhibits the recirculation logic (to be discussed) to permit the index code 1010 to shift straight through along a lead 160 extending from the H output of register 50 to one of the two inputs of AND gate 76. Since the other input of AND gate 76 is held at the high level by the inhibit lead 94, the index code is shifted directly to the serial input of the first register 46 via AND gate 76 and OR gate 72. Once the index code is back in its starting position in the register 46, this is sensed by the negative logic NAND gate 80 and the AND gate 82 to trigger the one shot 84, thereby resetting flip-flop 62 by the one shot output delivered along a lead 162. When the flip-flop 62 resets, AND gate 60 is disabled and clock pulses are no longer applied to the registers.

The reason the inhibit lead 94 also prevents any received pulses from interfering with the straight transfer of the index code may be appreciated from the action of AND gate 74 at the time that lead 94 (and hence one of its inputs) is at the high level. The other input of gate 74 is connected by a lead 164 to the output of inverter 96, which is the NOT H output of register 50. A lead 166 connects the output of gate 74 directly to the reset input of flip-flop 70. Therefore, whenever the NOT H output of register 50 is high, the reset input R of flip-flop 70 is activated. Although the reset input of flip-flop 70 is released when the NOT H output of register 50 is low, the flip-flop 70 still cannot be set until the next clock pulse and at that time the NOT H output will be high again (in accordance with the 1010 code).

Figure 7:
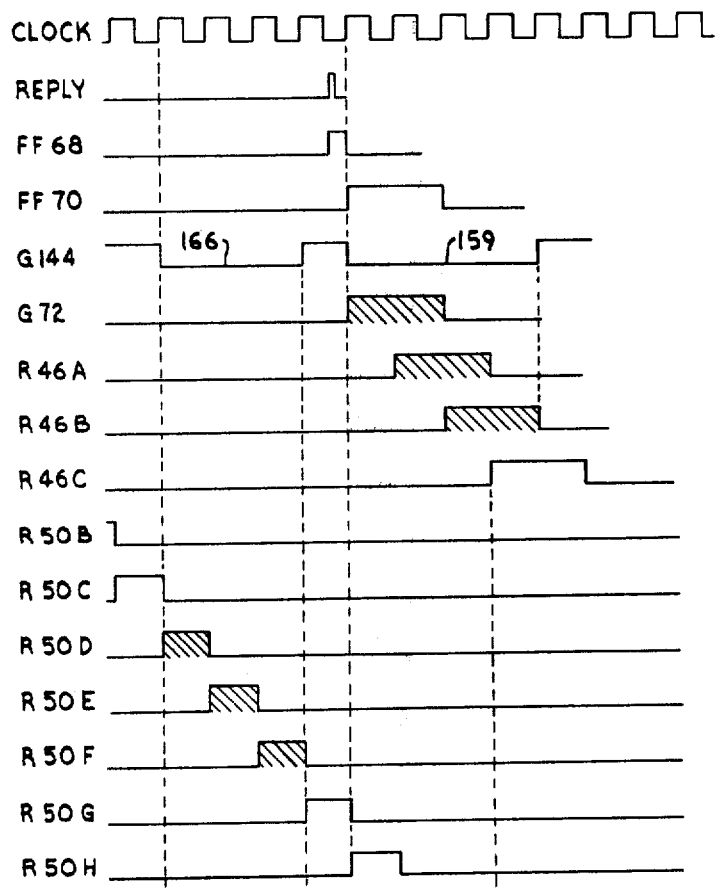

FIG. 7 illustrates the operation of the detector circuitry during the second scan, it being assumed that the previously received pulse is the synchronous reply pulse. Therefore, it recurs during the fifth range interval and the flip-flops 68 and 70 are set as before. The scan is initiated by the second PRF pulse in the same manner as in the previous scan, by the resetting of flip-flop 92 and the setting of flip-flop 62. Note in this latter respect that the lead 154 extending from the NOT Q output of flip-flop 92 is connected to one of the inputs of the OR gate 64. (Although the PRF pulse is also delivered to the CK input of flip-flop 126, this flip-flop remains reset since the D input thereof is still low at the time that the leading edge of the PRF pulse occurs.)

In FIG. 7 it may be seen that the pulse in storage from the first scan has been shifted from the memory bit in register 50 from which the B output is taken, to the memory bit having the G output by the successive application of five clock pulses corresponding to the first five range intervals of the second scan. The high level G output of register 50, therefore, coincides in time with the setting of flip-flop 68. The correlation logic determines that the two pulses on successive scans have arrived at the same range interval; therefore, flip-flop 70 now stays set for two range intervals instead of one. Accordingly, a two pulse train has been developed and will now be shifted down the line through the registers.

Referring to the output condition of NOR gate 144 illustrated in FIG. 7, the synchronous reply pulse recurred in the slot or range interval between the postgate 159 and a three slot pregate 166. The shaded pulses at the D, E and F outputs of register 50 show the generation of the pregate 166 by the action of OR gate 142, inverter 138, and AND gate 140. The three slot pregate 166 serves to inhibit the AND gate 66 at the input for three range intervals prior to a possible repeating pulse in order to preclude the inadvertent generation of the 1010 index code by random received pulses. It may be noted that the postgate 159 is now four slots in length due to the two pulse train now in storage and which is clocked through the memory bit in register 46 corresponding to the B output thereof. Again, the shaded output of gate 72 and the A and B outputs of register 46 illustrate the generation of the postgate 159.

The input and correlating circuitry 22 executes an addition function in forming the two pulse train just described above. Referring to FIG. 4, the flip-flop 70 now remains set for two range intervals because the NOT H signal from register 50 (low level) on its K input prevents the sixth interval clock pulse from resetting it. It may be seen in FIG. 7 that the H output of register 50 is high (due to the previous pulse in storage) during the interval when flip-flop 70 is initially set. Accordingly, NOT H is still low at the time of the next clock pulse which would otherwise reset flip-flop 70. It should be remembered that transitions occur on the positive going edges of clock pulses and that, therefore, the H output of register 50 will not have returned to the low level at the time that the leading edge of the second clock pulse occurs following initial setting of the flip-flop 70.

From FIG. 7 it may be appreciated that the memory bit in register 50 corresponding to the B output thereof represents the fifth range interval. Accordingly, the bit having the F output represents the first range interval, the G and H outputs of register 50 being employed in conjunction with the recirculation logic to correlate the pulse information received on successive scans. For this reason, the embodiment of the invention illustrated in detail in FIG. 4 actually has a 263 interval rather than a 265 interval capacity due to the use of the G and H outputs of register 50 for this purpose.

Figure 8:
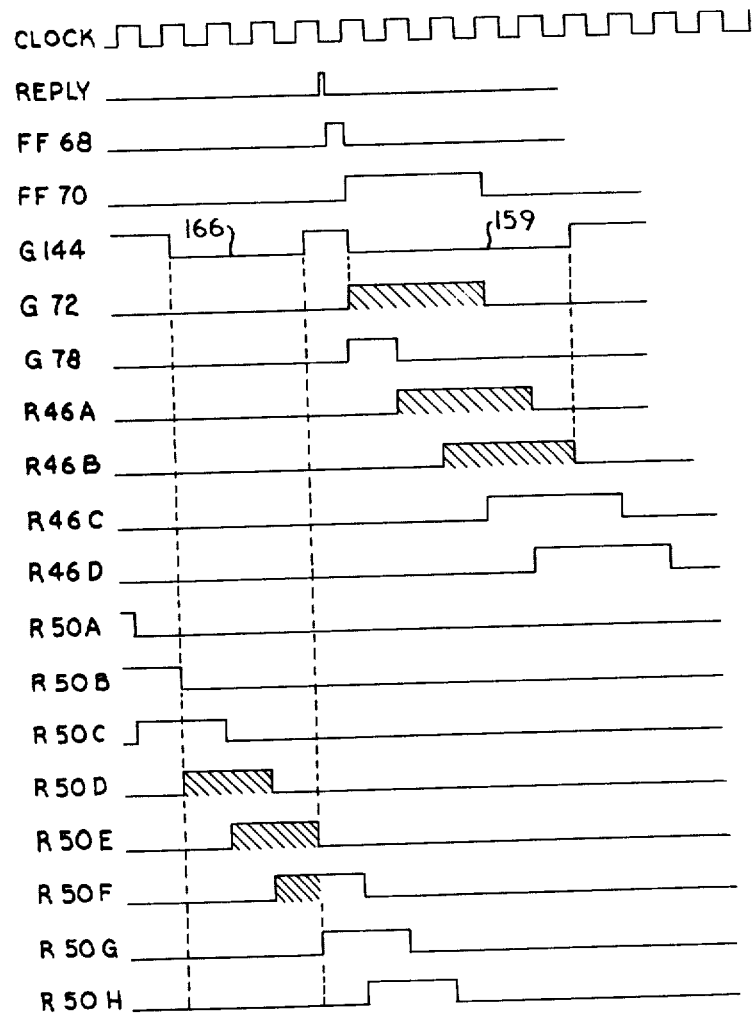

Referring to FIG. 8, the diagram illustrates the conditions of the various outputs on the third scan assuming that the synchronous reply pulse at the fifth range interval is again received. The postgate 159 lengthens by another interval and the flip-flop 70 now remains set for three intervals to produce a three pulse train that is transferred to the register 46 and on down the line. However, if the synchronous reply fails to occur (or if previous pulses at the fifth range interval were random pulses), then the logic executes a subtraction function best understood with reference to the output condition of AND gate 78 during the sixth range interval. Flip-flop 70, of course, will not be set since no pulse is received. The three inputs to gate 78 are all at the high logic level only during the one range interval that the G and H outputs of register 50 are high. Therefore, only a single pulse will not be transferred by the OR gate 72 to the serial input of the register 46. The net result is that the previous two pulse train in storage has now been reduced to a single pulse.

More specifically, a lead 168 connects one of the inputs of the AND gate 78 to the NOT Q output of flip-flop 104, such output being at the high level while the circuitry is correlating. Another of the inputs of gate 78 is connected by the lead 160 to the H output of register 50. The third input to gate 78 is connected via a lead 170 to the G output of register 50. Had there been only one pulse in storage from a previous scan or scans, then this pulse would have been subtracted leaving no information to transfer or recirculate since the output of gate 78 would remain low as the single pulse in storage is shifted to the G and then the H outputs of register 50. It may be appreciated, therefore, that there is no information for the OR gate 72 to transfer to the register 46 unless a high level output appears either from the AND gate 78 or the flip-flop 70.

In the illustrated embodiment, range acquisition is indicated when a five pulse train is developed. This pulse count verifies the identity of the synchronous reply pulse and causes the circuitry to go from the search to the track mode. Referring to FIG. 4, the AND gate 98 will deliver an output when a train of four pulses is stored in the four bits of register 50 corresponding to the D, E, F and G outputs thereof (the existence of a pulse in storage at the E output is assumed). Flip-flop 100 is set on the next clock pulse to enable the AND gate 102 connected to its Q output. Via a lead 172, the other input of the AND gate 102 senses whether or not flip-flop 70 is set, meaning that another synchronous pulse has been received. If so, the Q output of flip-flop 70 is high and the output of AND gate 102 sets flip-flop 104. The raising of the Q output of flip-flop 104 to the high logic level indicates range acquisition and places one of the two inputs of NAND gate 106 at the high level. The other input of NAND gate 106 goes high when the flip-flop 62 is reset at the end of the scan. Therefore, the output of NAND gate 106 now goes low and sets flip-flop 110 to raise its Q output to the high level and produce the track command.

OPERATION IN TRACK MODE

The clock 114 and the track circuitry 112 include an 8 mHz oscillator and a divide-by-160 network, the output from such network being the clock pulses that are delivered to the AND gate 60 and which have a period of 20 μsec. Accordingly, 160 counts are produced during each range interval. At the time of range acquisition when the presence of a five pulse train is first indicated by the high level output at input gate 66 and AND gate 98, latches in the divide-by-160 network are activated to store the information in the counters of the network at that time. This function is executed in response to the high logic level at input 114 of the track circuitry 112. By latching the time memory, information is stored as to the offset necessary to align the next synchronous reply pulse with the center of the slot (range interval) in which it will appear. Accordingly, on the first range scan of operation in the track mode, a time delay is induced into the clock 14 equal to the number stored in the divide-by-160 network counters, such number representing the fraction of a range interval that the clock must be delayed to place the next reply pulse in the center of the slot in which it will appear based on its time of arrival during the previous scan when the range was acquired.

The track circuitry 112 also generates the track gate (see the track gate at 150 in FIG. 5) at the expected time of arrival of the next synchronous reply pulse, the width of the gate being equal to one-tenth mile and centered in time on the expected time of arrival of the reply pulse. This is applied to the TRACK GATE input of the AND gate 66 so that AND gate 66 is now enabled only when the synchronous pulse is expected. (It should be understood, however, though not illustrated herein, that the present invention is also inherently capable of searching other range intervals while tracking by disabling the AND gate 66 only during a preselected number of range intervals on each side of the track gate.)

An early gate and a late gate are also produced by the track circuitry 112 and are utilized in the tracking logic. The early gate is synthesized from the circuitry prior to the expected arrival time of the synchronous reply pulse and terminates at the leading edge of the track gate, whereas the late gate commences at the trailing edge of the track gate. If the reply pulse occurs during the early or late gate, then the counters in the divide-by160 network are corrected to return the reply pulse to coincidence with the track gate on the next scan. It should be understood that the reply pulse is fed directly from the decoder to the correction logic of the track circuitry 112 for this purpose.

Since the aircraft is, of course, moving relative to the ground station transponder, it will be necessary from time to time to change range intervals once the correction can no longer be made within a given slot. This is the function of the slop jump network 58. As the aircraft closes on the ground transponder, the jump is effected by interrupting one cycle of the clock pulse from the lead 56 while continuing to excite the lead 54, thereby advancing the information in the four memory bits of the register 46 while holding the information for one clock pulse in the registers 48 and 50. The flip-flop 52 functions at this time to receive any information being clocked from the D output of the register 46 (any information in the flip-flop 52 would be lost, but this is inconsequential). Conversely, as distance increases, the slot jump is effected by interrupting one cycle on lead 54 without interrupting lead 56. Thus, the register 46 and the flip-flop 52 would be held for one range interval while the registers 48 and 50 are advanced.

The function of the memory 116 is to store additional pulse information after the pulse train reaches a length of twelve pulses. Through the use of this memory function, loss of the reply pulse for several seconds will not initiate another search. Instead, the system stays in the track mode until the pulse train is diminished to three pulses.

The AND gate 118 delivers an output to the memory 116 once the pulse train totals 12 as sensed by the outputs of the registers 46 and 50. This causes delivery of an output pulse along a lead 174 to the OR gate 90 to set flip-flop 92 to, in turn, activate the inhibit lead 94 and permit the twelve pulse train to shift straight through without any change in size. If the reply pulse is received that would have been added to the twelve pulse train, this is sensed by the counting input 175 of the 0-128 counter of memory 116 which is connected to the Q output of flip-flop 70 by lead 172. If the Q output of flip-flop 70 is high, the counter counts up one. The flip-flop 70 resets after the pulse train has been recirculated into the register 46, flip-flop 52 and register 48 due to the NOT H output from register 50 on its K input. Conversely, if flip-flop 70 is not set (a miss), then the count existing in memory 116 goes down by one. Should memory 116 fill (a count of 128), it holds but counts down if flip-flop 70 fails to set during a scan.

If the reply pulse is lost, then once the memory counts down to zero and flip-flop 70 again fails to set, the output from memory 116 is no longer delivered to lead 174 and flip-flop 92 is not set. Now the continuing failure to receive reply pulses reduces the pulse train by the subtraction logic previously described. Ultimately, by the action of AND gate 108, flip-flop 110 is reset since its D input goes low when flip-flop 100 can no longer be set due to the absence of a high level output from AND gate 98 (only three pulses remaining in the train). The resetting of flip-flop 110 activates the clear register logic 30 via OR gate 120 to clear the registers and change from track back to operation in the search mode.

Having thus described the invention what is claimed as new and desired to be secured by Letters Patent is:

1. In a ranging system employing repeated range scans each initiated by a search pulse, a detector for us in a receiver for locating a synchronous return pulse occurring among random pulses received during each range scan, said detector comprising:
information storage means having a number of memory bits representing a corresponding number of range intervals covering the range being scanned;
input means coupled with said storage means for delivering received pulses thereto for storage in memory, and including means for correlating pulse information stored in memory during a given range scan with newly arriving pulses received at the same range intervals during a subsequent range scan,
said correlating means causing said storage means to accumulate multiple pulse information at the range at which the synchronous return pulse is occurring and, in each range scan, effecting the destruction of previously stored pulse information at those range intervals where random pulses were received during the previous range scan; and
output means responsive to said multiple pulse information for indicating range acquisition when such information corresponds to a predetermined return pulse count sufficient to verify the identity of the synchronous return pulse.

2. The detector as claimed in claim 1, wherein said multiple pulse information comprises a train of pulses accumulated at the range of the recurring synchronous return pulse, and wherein said correlating means includes means which in successive range scans adds pulses to memory in response to the recurring synchronous return pulse to cause said pulse train to accumulate to said predetermined pulse count.

3. The detector as claimed in claim 1, wherein said correlating means includes means for subtracting in each range scan one pulse from memory at each range interval where a pulse is not received but where pulse information was stored from a previous range scan or scans, and adding one pulse to memory at each range interval where a pulse is received, whereby only the synchronous return pulse will cause the accumulation of said predetermined pulse count.

4. The detector as claimed in claim 1, wherein is provided circuit means operable during each range scan to deliver stored pulse information to said input means from said storage means in serial form in synchronism with the successive range intervals of the repeating range scan, and wherein said correlating means is responsive to both the newly arriving pulses and the serial pulse information delivered by said circuit means.

5. In a ranging system employing repeated range scans each initiated by a search pulse, a detector for use in a receiver for locating a synchronous return pulse occurring among random pulses received during each range scan, said detector comprising:
information storage means having a number of memory bits representing a corresponding number of range intervals covering the range being scanned, said memory bits including a first bit representing the first range interval, a final bit representing the last range interval, and intermediate bits representing successive range intervals between said first and final bits;
input means coupled with said storage means for exciting the final memory bit in response to pulses received during a range scan;
information transfer means coupled with said storage means for transferring the information in said final memory bit to the remaining bits in succession as each range interval of a given range scan occurs in time;
circuit means coupled with said first memory bit and said input means and operable during each range scan to recirculate pulse information stored in said storage means during the preceding range scan,
said input means including means for correlating recirculating pulse information delivered by said circuit means and newly arriving pulses received in synchronism with the recirculating information to cause said storage means to accumulate multiple pulse information at the range at which the synchronous return pulse is occurring and to effect in each range scan the destruction of previously stored pulse information at those range intervals where random pulses were received during the previous range scan; and
output means responsive to said multiple pulse information for indicating range acquisition when such information corresponds to a predetermined return pulse count sufficient to verify the identity of the synchronous return pulse.

6. The detector as claimed in claim 5, wherein said correlating means includes means for subtracting in each range scan one pulse from memory at each range interval where a pulse is not received but where pulse information was stored from a previous range scan or scans, and adding one pulse to memory at each range interval where a pulse is received, whereby only the synchronous return pulse will cause the accumulation of said predetermined pulse count.

7. The detector as claimed in claim 6, wherein said correlating means includes means for effecting said accumulation of multiple pulse information in said storage means by successive excitation of the final memory bit commencing with the range interval at which the synchronous return pulse is occurring, whereby a pulse train is stored in a series of as many adjacent memory bits as the number of pulses of the pulse train, and wherein said output means indicates range acquisition when said number of pulses of the pulse train equals said predetermined pulse count.

8. The detector as claimed in claim 7, wherein means is provided coupled with said input means and responsive to pulse information at the time of delivery thereof to said storage means by said input means for blocking any pulses received during a predetermined plurality of range intervals thereafter, whereby to prevent interference with the operation of said correlating means.

9. The detector as claimed in claim 7, wherein said information transfer means includes a clock for generating clock pulses at a repetition rate corresponding to said range intervals, and wherein said storage means includes a shift register responsive to said clock pulses and provided with said number of memory bits, said transfer means commencing delivery of said clock pulses to said shift register in response to the search pulse initiating each range scan and terminating said delivery after the last range interval of the scan.

10. The detector as claimed in claim 9, wherein said storage means has a plurality of additional memory bits, and wherein means is provided coupled with said register for inserting an index code into said additional memory bits to designate the limit of the range being scanned, said transfer means terminating said delivery of clock pulses to the register when said index code returns to storage in said additional bits after a recirculation cycle.

11. The detector as claimed in claim 10, wherein means is provided coupled with said input means and responsive to said recirculating pulse information for blocking any pulses received during a plurality of range intervals before each range interval or series thereof in which pulse information was stored during the preceding range scan, whereby to prevent received pulses from being stored in a configuration duplicating said index code.

12. The detector as claimed in claim 9, wherein said transfer means includes means for counting said clock pulses to determine when each scan has been completed, and means responsive to a determination that a scan has proceeded through the last range interval for effecting said termination of delivery of clock pulses to the register.

13. The detector as claimed in claim 7, wherein said output means includes means which continues to indicate range acquisition only so long as said pulse train in succeeding range scans contains at least a predetermined minimum number of pulses.

14. The detector as claimed in claim 5, wherein is provided tracking means coupled with said output means and responsive to said indication of range acquisition for generating a track gate during subsequent range scans which occurs in the range interval of the synchronous return pulse, and means responsive to said search pulse and said track gate for measuring the time duration therebetween in each range scan to determine the distance represented by the synchronous return pulse.

15. The detector as claimed in claim 5, wherein said multiple pulse information comprises a train of pulses accumulated at the range of the recurring synchronous return pulse, and wherein said correlating means includes means which in successive range scans adds pulses to memory in response to the recurring synchronous return pulse to cause said pulse train to accumulate to said predetermined pulse count.

16. In a ranging system employing repeated range scans each initiated by a search pulse, a method of locating a synchronous return pulse occurring amoung random pulses received during each range scan, said method comprising the steps of:

a. establishing a number of range intervals covering the range being scanned;
b. during an initial range scan, remembering the range intervals in which pulses are received;
c. during the next range scan, destroying from memory those pulses in range intervals in which the pulses fail to recur, and remembering the range intervals in which newly arriving pulses occur;
d. during succeeding range scans, continuing to remember the range intervals in which newly arriving pulses occur to thereby accumulate a pulse count of greater than unity representing the range interval in which the synchronous return pulse is occurring, and reducing the pulse count by one each time the synchronous pulse fails to recur; and
e. indicating range acquisition when said pulse count reaches a predetermined number sufficient to verify the identity of the synchronous return pulse.

17. The method as claimed in claim 15, wherein said step (d) includes subtracting from memory one pulse at each range interval in which a new pulse fails to arrive but where pulse information has been remembered from a previous range scan or scans, and adding to memory one pulse at each range interval in which a new pulse arrives, whereby only the synchronous return pulse will result in the accumulation of said predetermined pulse count.

18. The method as claimed in claim 15, wherein said step (d) includes adding pulses to memory in successive range scans in response to the recurring synchronous return pulse to cause the accumulation of a train of pulses at the range of the synchronous return pulse, and wherein said range acquisition in said step (e) is indicated when the number of pulses in said train equals said predetermined pulse count.

19. In a ranging system employing repeated range scans each initiated by a search pulse, a detector for use in a receiver for locating a synchronous return pulse occurring among random pulses received during each range scan, said detector comprising:

information storage means having a number of memory bits representing a corresponding number of range intervals covering the range being scanned;
input means coupled with said storage means for delivering received pulses thereto for storage in memory, and including means for correlating pulse information stored in memory during each range scan with newly arriving pulses received at the same range intervals during the next range scan,
said correlating means in each range scan causing said storage means to store correlated pulse information at the range at which the synchronous return pulse is occurring; and
output means responsive to said correlated pulse information for indicating range acquisition when such information corresponds to a sufficient number of recurrences of said synchronous return pulse to verify its identity.

* * * * *